US007021128B2

(12) United States Patent
Rauchfuss et al.

(10) Patent No.: US 7,021,128 B2
(45) Date of Patent: Apr. 4, 2006

(54) MISFIRE DETECTION USING ACOUSTIC SENSORS

(75) Inventors: Mark S. Rauchfuss, Scottsdale, AZ (US); Stephen R. W. Cooper, Fowlerville, MI (US); Nicholas M. Zayan, Fenton, MI (US)

(73) Assignee: AVL North America, Inc., Plymouth, MI (US)

( * ) Notice: Subject to any disclaimer, the term of this patent is extended or adjusted under 35 U.S.C. 154(b) by 0 days.

(21) Appl. No.: 10/425,181

(22) Filed: Apr. 29, 2003

(65) Prior Publication Data

US 2004/0003651 A1 Jan. 8, 2004

Related U.S. Application Data

(60) Provisional application No. 60/376,307, filed on Apr. 29, 2002.

(51) Int. Cl.
*G01L 3/26* (2006.01)
*G01L 5/13* (2006.01)
*G01M 15/00* (2006.01)

(52) U.S. Cl. .................................................... 73/117.3

(58) Field of Classification Search ............... 73/35.07, 73/115, 117.3, 669, 35.12, 116; 701/111, 701/29; 123/406.2
See application file for complete search history.

(56) References Cited

U.S. PATENT DOCUMENTS 4,602,507 A * 7/1986 Hayes ....................... 73/117.3
5,115,778 A * 5/1992 Holroyd .................. 123/406.2
5,763,769 A * 6/1998 Kluzner ....................... 73/115
5,935,189 A * 8/1999 Park .......................... 701/111

* cited by examiner

*Primary Examiner*—Eric S. McCall
*Assistant Examiner*—Octavia Davis
(74) *Attorney, Agent, or Firm*—Carlson, Gaskey & Olds

(57) ABSTRACT

A misfire detection system is provided including an internal combustion engine having a combustion chamber and an exhaust system in fluid communication with the combustion chamber. An acoustic sensor is associated with either the combustion chamber or the exhaust system for sensing noise. The controller receives a signal from the acoustic sensor for determining whether the noise is indicative of misfire. One or more acoustic sensors may be fluidly and/or mechanically coupled to the engine or other portion of the powertrain system. The acoustic sensor generates a signal having a frequency that may be compared to engine temperatures, speeds, and loads to determine whether a misfire event has occurred in one of the cylinders. The signature of the frequency may be determined and compared with a known set of frequencies for desired engine operation to determine whether a misfire has occurred.

17 Claims, 2 Drawing Sheets

MISFIRE DETECTION USING ACOUSTIC SENSORS

This application claims priority to Provisional Application Ser. No. 60/376,307, filed Apr. 29, 2002.

BACKGROUND OF THE INVENTION

This invention relates to misfire detection in internal combustion engines, and more particularly, the invention relates to a method and apparatus for sensing misfires in an engine.

There is a need to monitor the combustion in an internal combustion engine, for the purpose of controlling hydrocarbon output. Complete combustion is desirable for maximum output from each piston. Furthermore, complete combustion ensures that all of the fuel is consumed during the combustion process. During a misfire, unburned fuel may be expelled from the exhaust valve, which will enter the exhaust system and increase hydrocarbon emissions. Misfires also contributed to a rough running engine that is noticeable to the vehicle operator.

Presently, one such method uses a pressure sensor to detect the exhaust gas pulse in the exhaust manifold resulting from the opening of the exhaust valves. However, the pressure sensor is only sensitive enough to pick up the opening and closing of the exhaust valve and no information regarding combustion. Pressure sensors typically only detect pressure pulsations of up to approximately 10 Hz. The pressure pulses attributable to a misfire may be in the audible noise frequency range, which may be in the range of 100 Hz–1,000 Hz or more. The prior art pressure sensors are not suitable for detecting misfires.

Misfires are also detected the utilizing knock sensors. Knock sensors utilize an accelerometer that is attached to the exterior of the engine, such as the engine block, to detect the vibration of engine block. The detected vibrations are examined to determine whether they are attributable to a misfire. Knock sensors only determine whether there is a misfire in the engine and are not capable of determining to which piston the misfire is attributable.

SUMMARY OF THE INVENTION AND ADVANTAGES

The present invention provides a misfire detection system including an internal combustion engine having a combustion chamber and an exhaust system in fluid communication with the combustion chamber. An acoustic sensor is associated with either the combustion chamber or the exhaust system for sensing noise. The controller receives a signal from the acoustic sensor for determining whether the noise is indicative of a misfire. One or more acoustic sensors may be fluidly and/or mechanically coupled to the engine or other portion of the powertrain system. The acoustic sensor generates a signal having a frequency, discrete frequencies or frequency ranges that may be compared to engine temperatures, speeds, and loads to determine whether a misfire event has occurred in one of the cylinders. The signature of the frequency may be determined and compared with a known set of frequencies for desired engine operation to determine whether a misfire has occurred.

Accordingly, the above invention provides a method and apparatus of determining whether a misfire has occurred and to which cylinder it is attributable.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

The present invention uses an acoustical sensor to detect misfire, the incomplete or absence of combustion and/or knock, a premature ignition. An acoustical transducer is utilized to give a better indication of combustion. The frequency content of a cylinder, exhaust system, or other powertrain portion is monitored. The acoustical response is compared to a model base (physical or empirical) for determining the quality of the combustion process.

Figure 1:
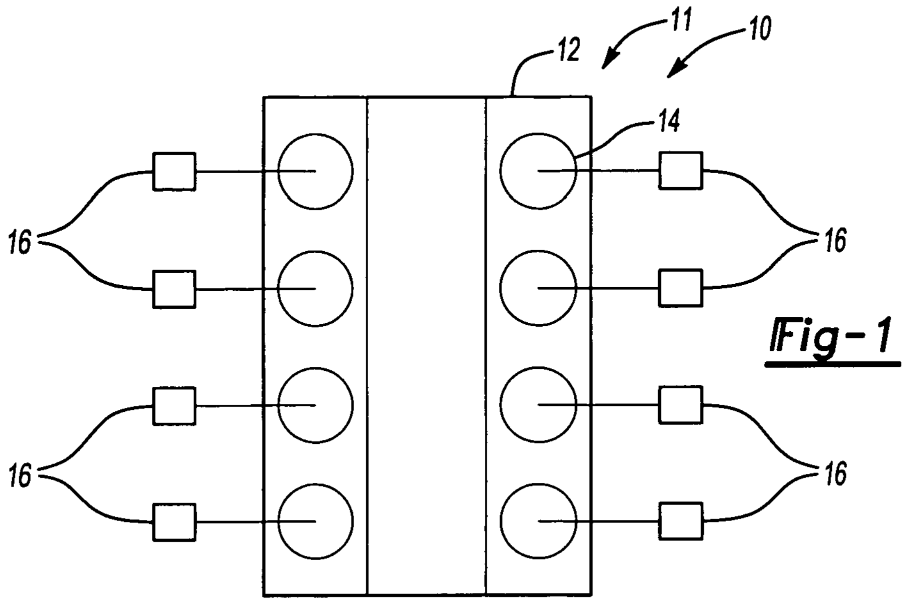
FIG. 1 is a is a schematic view of a acoustic sensor of the present invention located in a cylinder wall of the engine block.
Figure 2:
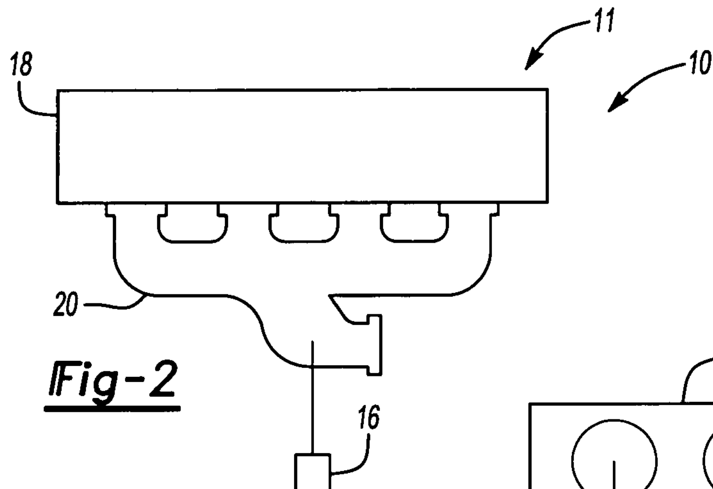
FIG. 2 is a schematic view of the present invention acoustic sensor located in an exhaust manifold.
Figure 3:
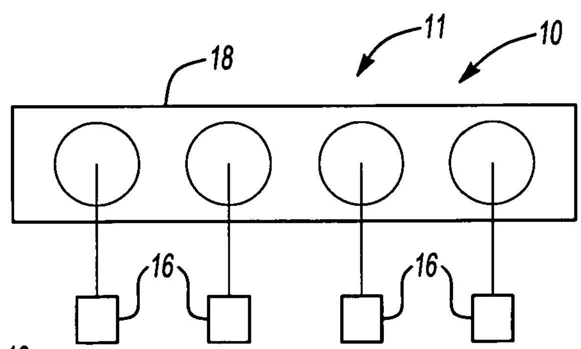
FIG. 3 is a schematic of the present invention of the acoustic sensor located in a combustion chamber.

One misfire detection system 10 is shown in FIG. 1. The system 10 may include an engine 11 with an engine block 12 having a cylinder 14. The block 12 includes a cylinder head 18 and exhaust manifold 20 secured to it, as shown in FIG. 2. An acoustic sensor 16 may be associated with the engine in one or more locations to discern a misfire or knock condition in each of the cylinders to better control the combustion characteristics to minimize the hydrocarbon output of the engine and minimize engine wear. For example, the sensors 16 may be supported on the block (FIG. 1), on the exhaust manifold (FIG. 2), or the cylinder head (FIG. 3). More specifically, the acoustic sensor may be located within the combustion chamber in the cylinder head (FIG. 3), for instance in a probe mounted in a fashion similar to a spark plug or glow plug or even located on a spark plug or glow plug where it will be acoustically coupled to the combustion event through the cylinder gasses. One of ordinary skilled in the art would appreciate that the acoustic sensor may be arranged in numerous suitable locations.

The acoustic sensor of the present invention has a sensitivity to higher frequencies than that of a pressure sensor, which may only sense frequencies below 10 Hz. For example, the acoustic sensor may sense noise in the audible range and above 10 Hz, preferably including between 100 Hz–1,000 Hz. Furthermore, the sensor 16 has a sufficient response time to detect misfires throughout the operating range of the engine.

In operation, the engine cylinder will be a reverberant system with sounds such as those generated by combustion and valves reflecting up, and down and across the cylinder. As a result, the sound measurement at any point in the cylinder will be a function of present and past sounds injected into the system. An additional complication is that the cylinder's volume and temperature are constantly changing which will in turn continuously change reverberation characteristics. However, for given combinations of temperature, speed and load, the timing and frequency content of sound generated by normal combustion will have distinctive signatures. Sounds generated by knock will necessarily occur earlier in the engine cycle and will have differing frequency contents as the flame front progression during a knock event will differ from that of normal combustion and the volume and temperature affecting the reverberant characteristics will differ.

Figure 4:
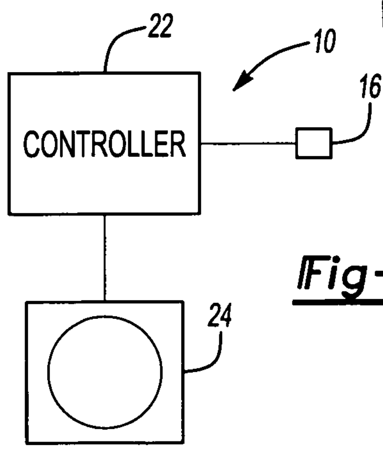
FIG. 4 is a schematic view of the present invention misfire detection system.
Figure 6:
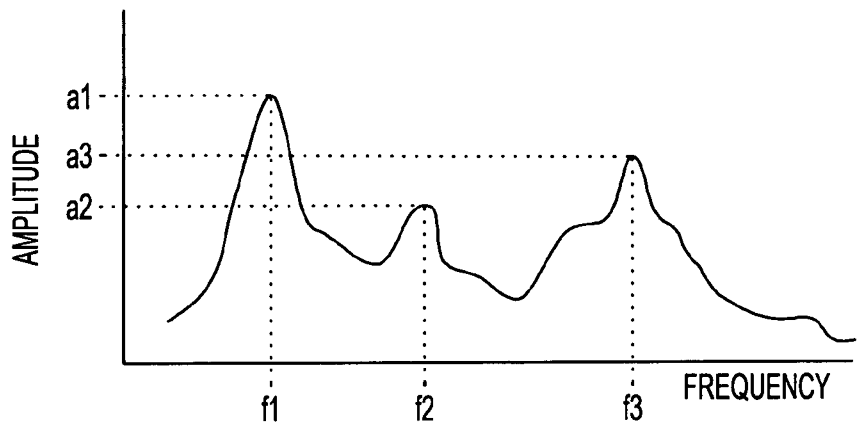
FIG. 6 is a graph of a frequency spectrum indicating signature amplitudes detected by the acoustic sensor.

For the embodiments shown in FIGS. 1–3, one or more acoustic sensors are fluidly coupled to the engine to detect combustion information. Referring to FIG. 4, the misfire detection system 10 may include a controller 22 that receives the signals from the acoustic sensor 16. The controller 22 compares the signal to stored data that is indicative of a misfire or knock to determine whether such a condition is occurring in one of the cylinders. The controller 22 may receive an engine speed signal from a sensor 24 to relate the acoustical information to an engine event. In one example, an acoustic sensor is mounted to one or more engine cylinders, as shown in FIG. 1, so as to be coupled to detect acoustic energies borne by the gasses in the cylinder while minimally coupling to acoustic energies coupled through the mechanical structure of the engine. With this approach, acoustic frequency domain features and/or signatures are mapped across a parameter space that could include load, speed and engine temperature and/or other parameters such as EGR and variable turbocharger position. The signatures could consist of amplitudes at selected frequencies in a manner analogous to formant analysis in speech synthesis and recognition. For example, as shown in FIG. 6, in the following representation of a frequency spectrum, the amplitudes a1, a2 and a3 at three peak frequencies f1, f2, f3 of a sound spectrum taken over a given time (or crank angle) interval are extracted.

Alternatively, the actual shape of the spectrum could be stored as a signature and or the power in all or portions of the spectrum. Additionally, time domain sequences of the combustion sound could be stored as templates. Peak sound amplitudes and times or time averaged sound power levels could also be stored as features or signatures of interest. The same or similar signatures and features extracted from the sound signal could also be stored for knock or other combustion modes of interest such as incomplete or failed combustion.

Figure 7:
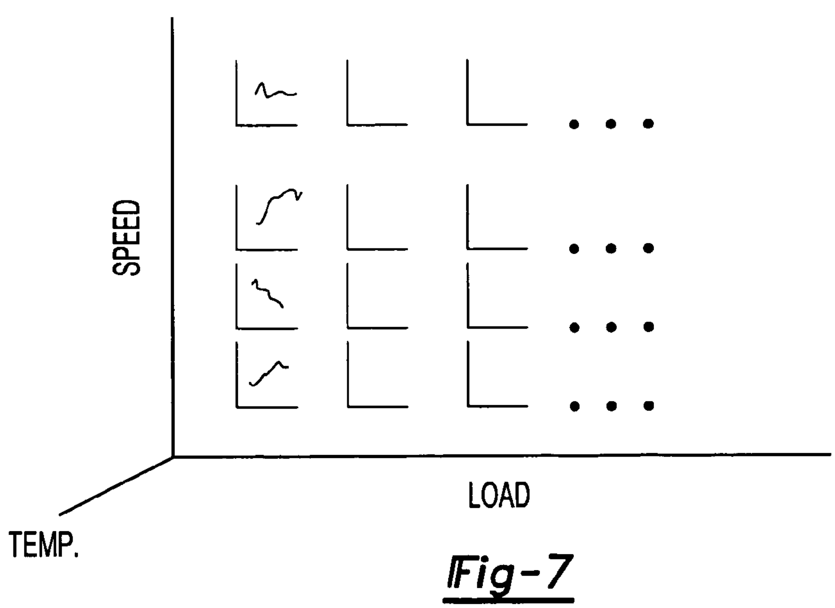
FIG. 7 is a frequency look-up table referencing engine speed, load, and temperature in proximity to the acoustic sensor.

The present invention captures the sound at preselected portions of a given engine cylinder's operating cycle. Some or all of the described features would then be extracted and compared to the stored features for the current engine operating point, as graphically indicated in the table shown in FIG. 7. Using pattern recognition techniques described in the literature such as neural net and/or statistical analysis among others, the extracted features and/or signatures would be matched to the stored ones. A determination would then be made as to whether they matched those expected for normal combustion or other combustion modes of interest. For instance, knock could be detected by having the pattern of extracted features and/or signatures match stored patterns of knock features and/or signatures for the current engine operating point. Conversely, knock could be detected by having its feature and/or signature pattern fail to match the pattern expected for normal combustion. Similarly, the degree of match for a given combustion mode could be used as a quality factor for combustion and be used as a feedback parameter in a cycle to cycle engine control scheme.

As an alternative approach to fluidly coupling the acoustic sensors to the cylinders, the sensors could be coupled to the cylinder wall, cylinder head, or exhaust stream. This would have the drawback of having the sensor be responsive to every mechanically coupled sound including all cylinder firing events. In such cases, a multiplicity of sensors in combination with time of flight and sound amplitude correlations could be used to determine which event came from which cylinder and when.

One or more structurally coupled acoustic sensors could be placed in addition to, or instead of, the fluid or gas coupled acoustic sensors. Feature and/or signature extraction and pattern analysis would be used as to infer preselected and mapped combustion modes or their absence. A complication with this approach is that structurally borne sounds can be expected to propagate throughout the engine resulting in sounds from multiple combustion events from one or more cylinders overlapping in the signal collected. In such a case simple signal identification techniques such as cross correlation and/or more complex techniques described in the signal identification literature, which is known to one of ordinary skilled in the art, may be applied to at least partially separate and classify the patterns generated by individual sound sources.

Figure 5:
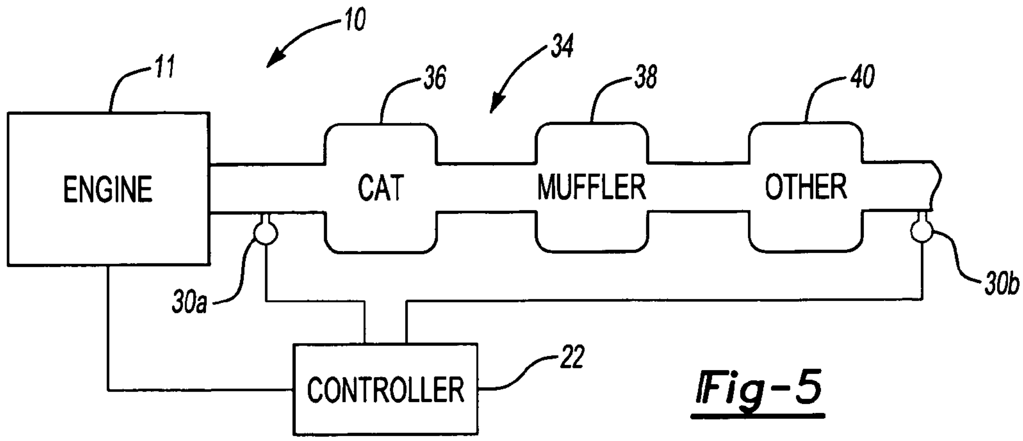
FIG. 5 is a schematic view of the misfire detection system associated with an exhaust system.

Turning now to FIG. 5, one or more acoustic sensors 30*a*, 30*b* are fluidly or mechanically coupled to the engine exhaust system 34 instead of, or in addition to, engine mounted acoustic sensors. Features and/or signatures would be extracted for the signals from these sensors and mapped across a preselected engine operating parameter space. The stored patterns would then be continuously matched to patterns collected during engine operation to determine the combustion modes and/or qualities in the engine. The exhaust system includes a catalytic converter 36, a muffler 38, and other exhaust components 40 that will create reverberations in the system 34. This approach is complicated by the fact that the comparatively long reverberations in the exhaust tract can be expected to result in an overlap and mixing of signals from two or more combustion events. Again, system identification techniques such as cross correlation or more complicated approaches found in the system identification literature would be applied to at least partially separate and classify the patterns generated by individual sound sources.

Patterns of acoustic features and/or signatures may be correlated to emissions in addition to combustion modes. For instance, the patterns for the lowest possible NOx emissions for a given combustion mode could be collected and stored across the expected engine operating space. Then for a given operating point the degree of match to these patterns could be used as a control feedback to drive the engine operation to minimum NOx emission.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

The invention claimed is:

1. A misfire and/or knock detection system comprising:

an internal combustion engine having a combustion chamber and an exhaust system in fluid communication with said combustion chamber;

an acoustic sensor associated with one of said combustion chamber and said exhaust system for sensing noise and producing a signal in response thereto; and a controller receiving said signal from said acoustic sensor for determining whether said noise is indicative of a misfire or knock, wherein said acoustic sensor detects frequencies above approximately 10 Hz.

2. The system according to claim 1, wherein said acoustic sensor is fluidly coupled to one of said combustion chamber and said exhaust system.

3. The system according to claim 1, wherein said acoustic sensor is mechanically coupled to one of said combustion chamber and said exhaust system.

4. A misfire and/or knock detection system comprising:

an internal combustion engine having a combustion chamber and an exhaust system in fluid communication with said combustion chamber;

an acoustic sensor associated with one of said combustion chamber and said exhaust system for sensing noise and producing a signal in response thereto; and a controller receiving said signal from said acoustic sensor for determining whether said noise is indicative of a misfire or knock; and wherein said engine includes a plurality of combustion chambers and a corresponding plurality of acoustic sensors associated with said plurality of combustion chambers.

5. The system according to claim 1, wherein said controller processes said signal to produce a frequency signature, said controller comparing said frequency signature with known frequency signatures indicative of desired engine operation.

6. The system according to claim 5, wherein said known frequency signatures relate to engine speed, load, and temperature.

7. The system according to claim 5, wherein said known frequency signatures include a plurality of frequencies having a plurality of amplitudes indicative of an engine event.

8. The system according to claim 1, wherein said acoustic sensor detects frequencies in a range including from approximately 100 Hz to 1000 Hz.

9. The system according to claim 1, wherein said acoustic sensor is mounted on said cylinder head.

10. The system according to claim 1, wherein said acoustic sensor is mounted on said exhaust system.

11. A method of detecting an engine misfire or knock comprising the steps of:

a) detecting a frequency with a sensor;

b) monitoring powertrain system parameters;

c) processing the frequency from the sensor relative to the powertrain system parameter to obtain an frequency feature; and d) comparing the frequency feature to a known frequency feature to determine an engine event, wherein said sensor detects frequencies above approximately 10 Hz.

12. The method according to claim 11, wherein said frequency feature is a signature.

13. The method according to claim 11, wherein said sensor is an acoustic sensor.

14. The method according to claim 11, wherein said engine event is a misfire.

15. The method according to claim 11, wherein said engine event is a NOx output from an engine.

16. The method according to claim 11, wherein said known frequency feature relates to engine speed, load, and temperature.

17. The system according to claim 11, wherein said sensor detects frequencies in a range including from approximately 100 Hz to 1000 Hz.

* * * * *